United States Patent [19]

Hunter

[11] 3,895,545
[45] July 22, 1975

[54] STEERING WHEEL TURNING DEVICE

[76] Inventor: Lee Hunter, 13501 Ladue Rd., Ladue, Mo. 63141

[22] Filed: Jan. 2, 1974

[21] Appl. No.: 429,506

[52] U.S. Cl. .................. 74/494; 74/625; 74/202; 74/209; 74/212; 180/77 R; 74/203; 180/79.1
[51] Int. Cl.² ........................................ B62D 1/24
[58] Field of Search .......... 180/79.1, 77 R; 74/494, 74/495, 625, 202, 203, 212, 209, 206

[56] References Cited
UNITED STATES PATENTS

| | | | |
|---|---|---|---|
| 2,805,585 | 9/1957 | Besserman | 180/79.1 |
| 2,928,291 | 3/1960 | Wilkerson | 74/494 |
| 3,003,363 | 10/1961 | Hart | 180/77 R |
| 3,648,539 | 3/1972 | Rouis | 74/494 |
| 3,762,239 | 10/1973 | Rouis | 74/494 |

Primary Examiner—Samuel Scott
Assistant Examiner—Allan R. Burke
Attorney, Agent, or Firm—Gravely, Lieder & Woodruff

[57] ABSTRACT

Steering wheel turning device for moving the wheels of a vehicle as required during wheel testing for alignment and repair. The device is mounted on the seat adjacent the steering wheel and is adjustable to suit the spacing of the wheel above the seat, as well as being capable of operating the steering wheel whether round or oval or other out of round shape.

7 Claims, 7 Drawing Figures

PATENTED JUL 22 1975 3,895,545

SHEET 1

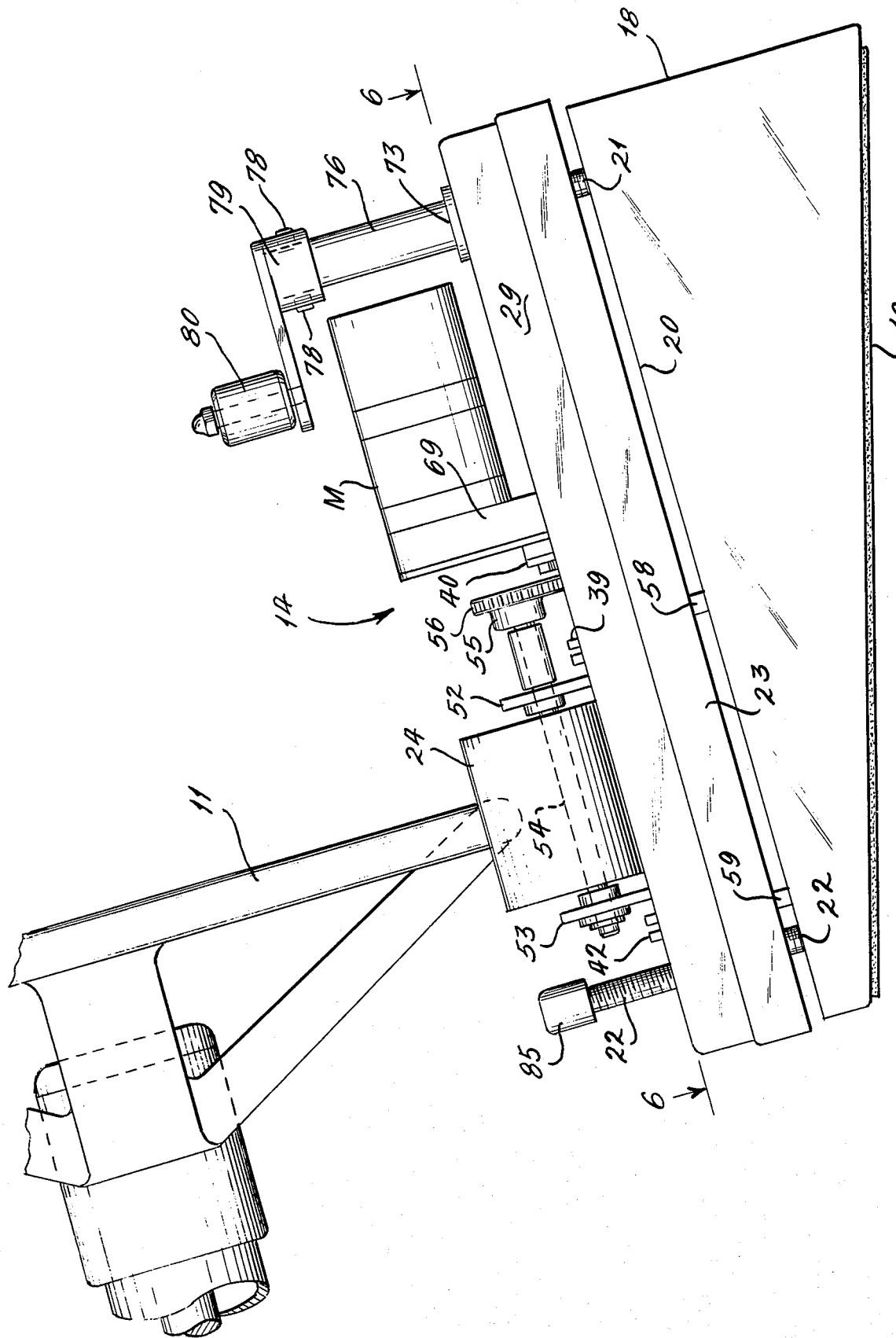

STEERING WHEEL TURNING DEVICE

BACKGROUND OF THE INVENTION

In the performance of certain vehicle steerable wheel alignment testing and adjustment operations it is necessary to swing the wheel into turned positions to the right and left of the straight ahead position. The present state of refinement in the provisions for steering vehicle wheels through power devices makes it difficult and sometimes impossible for a service person to swing the wheels by applying turning force on the wheels themselves. The power steering devices have been developed so that very great effort must be exerted on the wheels to turn them, while a very light force at the steering wheel will do the job. This condition is not conducive to expeditious service as the service person must leave the front end position and manually turn the steering wheel. Observations of the wheel suspension mechanism during wheel turning is not possible when the wheel has to be manually turned, unless an assistant is present to turn the steering wheel.

In addition to the above difficulty, more and more vehicle steering wheels are made in an out-of-round shape. The reasons are several, and have been brought about by the need for easy entry and exit from the drivers seated position, and by the trend toward the cosmetic effect of a "shaped" steering wheel.

BRIEF SUMMARY OF THE INVENTION

This invention is related to improvements in steering wheel turning devices.

The objects of this invention are to provide a wheel turning device easily adapted to most vehicles, to simplify the arrangement of the various components which make up an operative device, to make the device adjustable for accommodating "shaped" steering wheel as well as round steering wheels, and to provide positive driving contact between powered rollers and the steering wheel rim.

A preferred embodiment of the present steering wheel turning device comprises a seat engaging base which supports a component platform at an average angle to place the steering wheel driving roller means in a desired operating position, means to adjust the platform toward the steering wheel, and means to cause the driving rollers to adjust the driving positions in keeping with the shape or contour of the rim of the steering wheel. Of course, specific embodiments of the several components of the present character of wheel turning device will be set forth in more detail below.

BRIEF DESCRIPTION OF THE DRAWINGS

The presently preferred embodiment of this invention has been shown in the several views of the accompanying drawings, wherein:

FIG. 2 is an enlarged side view of the present device;

DETAIL DESCRIPTION OF THE INVENTION

Figure 1:
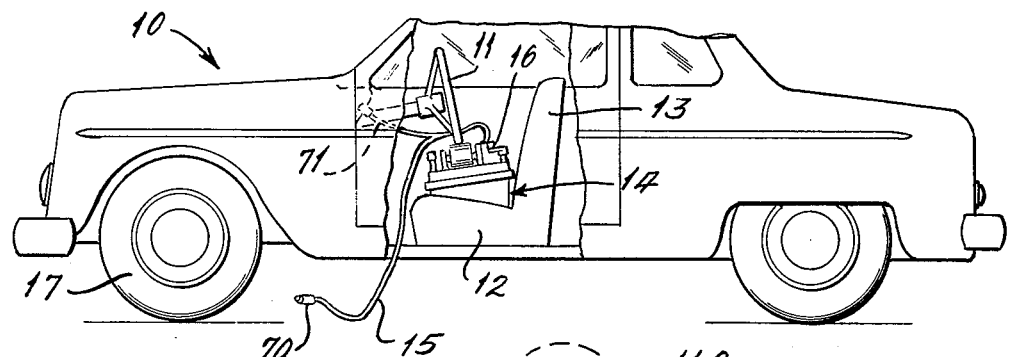
FIG. 1 is a fragmentary view of a passenger vehicle in which the steering wheel turning device has been placed in operating position and with the remote control lead in an accessible position adjacent the front wheel.

The vehicle 10 seen in FIG. 1 has the body broken out to facilitate the showing of the steering wheel 11 in relation to the drivers seat cushion 12 and seat back 13. The space between the bottom of the steering wheel 11 and the seat cushion 12 is occupied by the turning device 14, and the control cable 15 is seen to extend from the motor 16 to a convenient place near the front wheels 17 that require turning at some point in servicing or checking the steering alignment.

Figure 3:
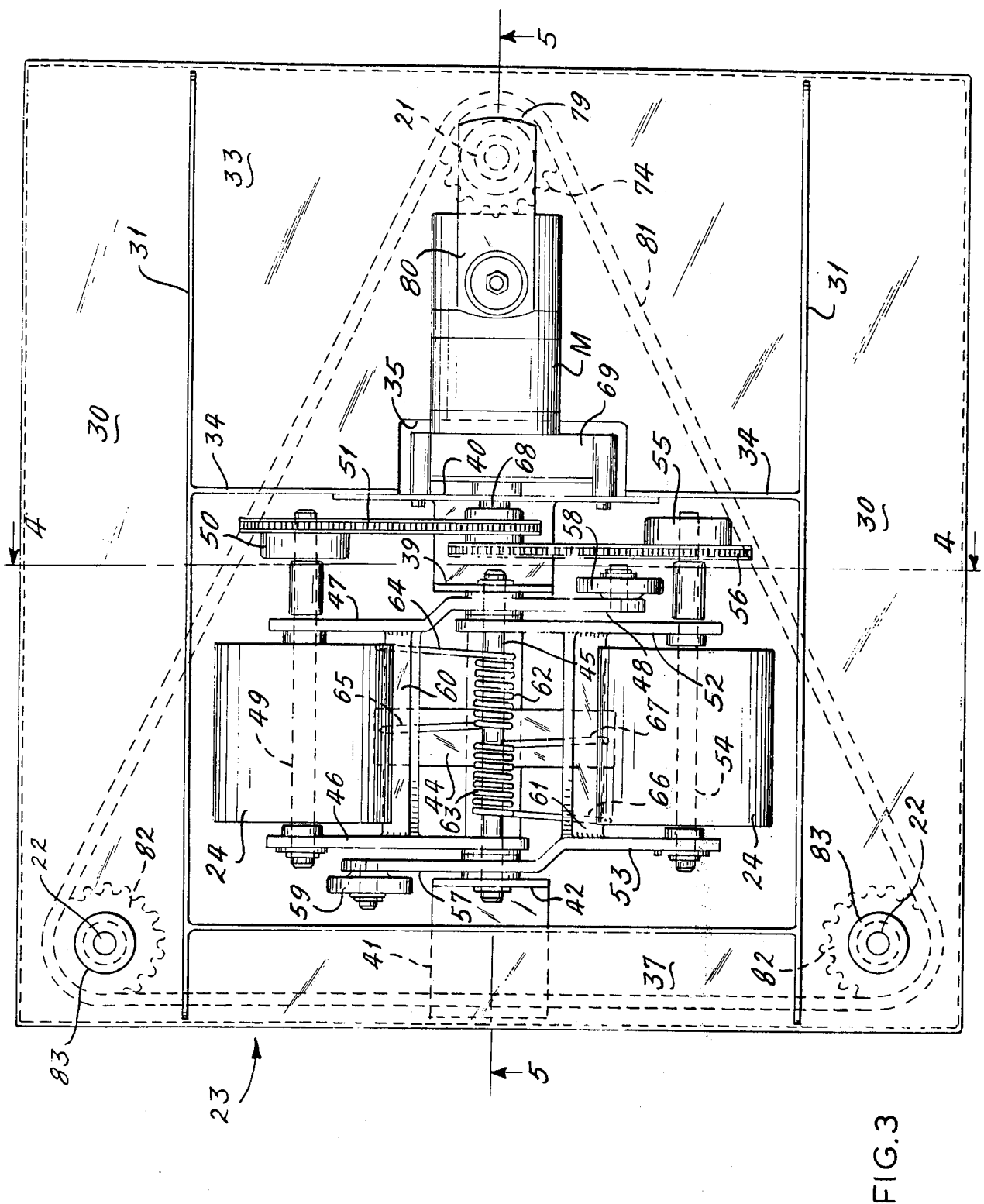
FIG. 3 is a top plan view of the device of FIG. 1.

FIG. 2 is an enlarged view of the present device 14 and shows the base 18 in the form of a wedge having a base plate 19 to fit on the seat cushion 12 and an upper margin 20 at an angle of about 15 degrees to the base 19. The base is open at the top to permit screw posts 21 and 22 (there being a pair of posts 22 as seen in FIG. 3) to extend upwardly through a platform assembly 23. The platform is adjustable toward or away from the steering wheel 11 so that the friction drums 24 may properly engage the wheel. These drums 24 are rotated by a suitable reversible motor M through means to be described in detail.

Figure 5:
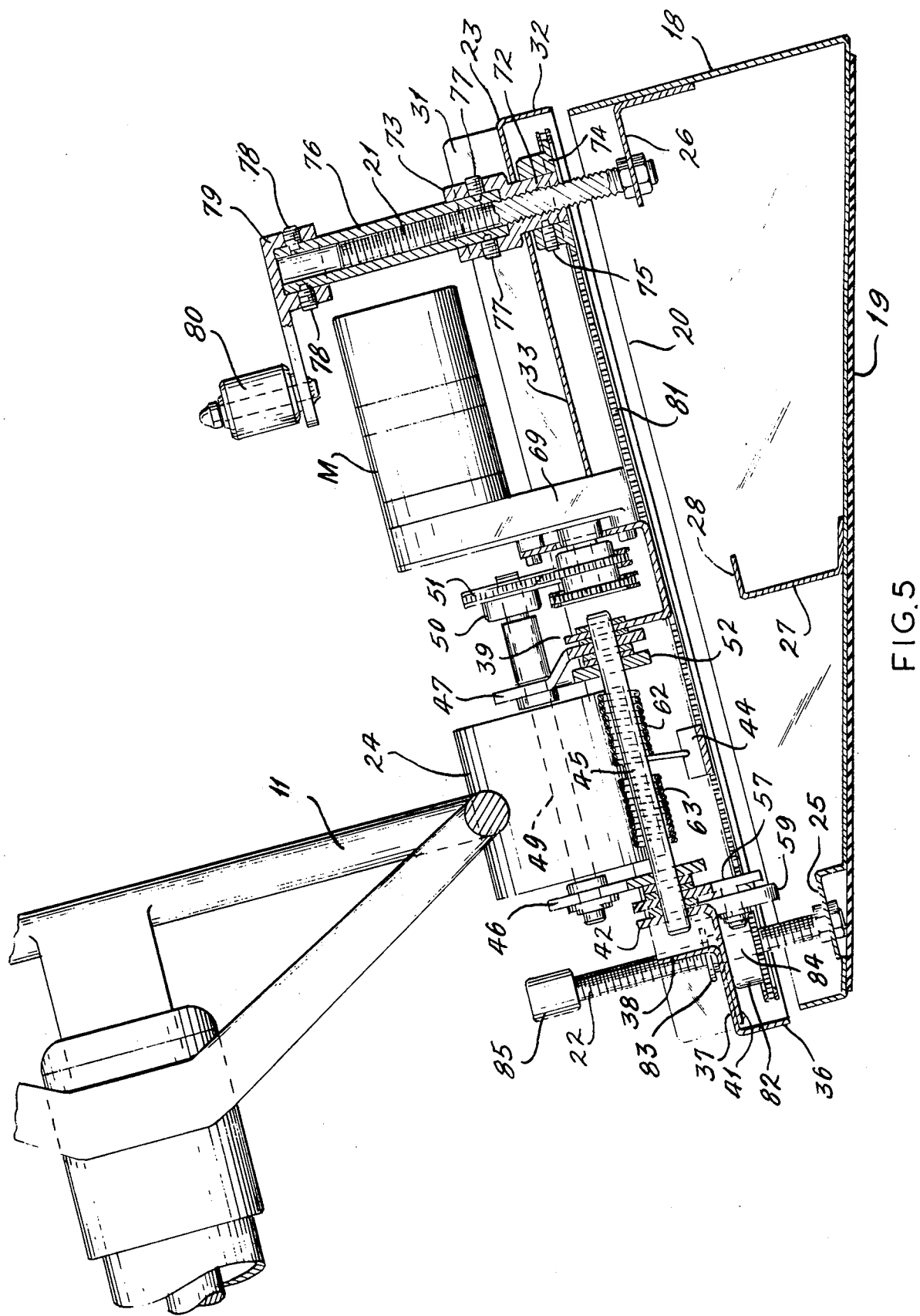
FIG. 5 is a sectional view taken along line 5—5 in FIG. 3.

In order to understand the construction of the device 14 reference will be made to FIGS. 5 and 6. In FIG. 5 the base 18 has a frame that is shaped with an inwardly jogged ledge 25 extending across the width of the base so that the bottom ends of the screw posts 22 can be secured therein against turning. A bracket 26 is positioned at the opposite side of the base frame from the ledge 25 to support the bottom end of the screw post 21 against turning. Between the ledge 25 and the bracket 26 there is located a channel member 27 that extends across the width of the base parallel to the ledge 25. The member 27 has a flange that functions as a ledge 28 and it is in the same plane with ledge 25. The purpose for ledges 25 and 28 will appear presently.

Figure 4:
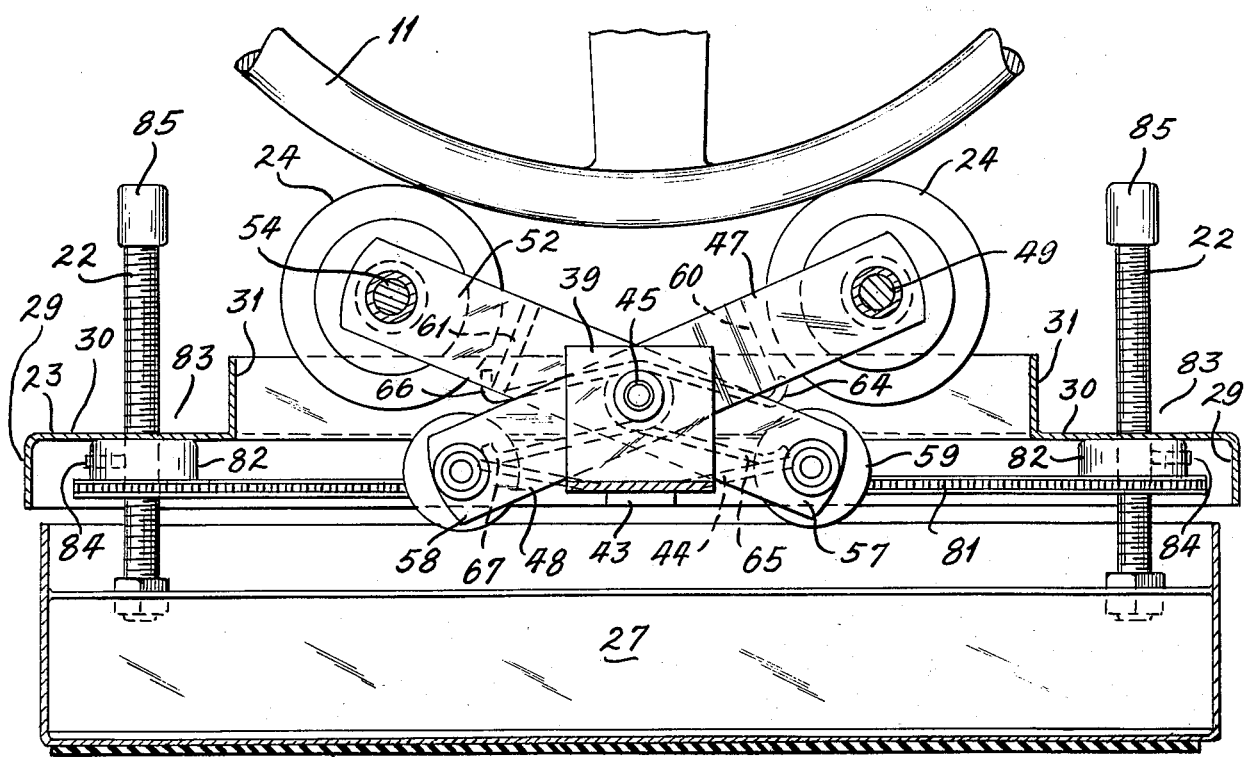
FIG. 4 is a sectional view, in fragmentary detail, of portions of the wheel turning rollers and adjustment means taken along line 4—4 in FIG. 3.
Figure 6:
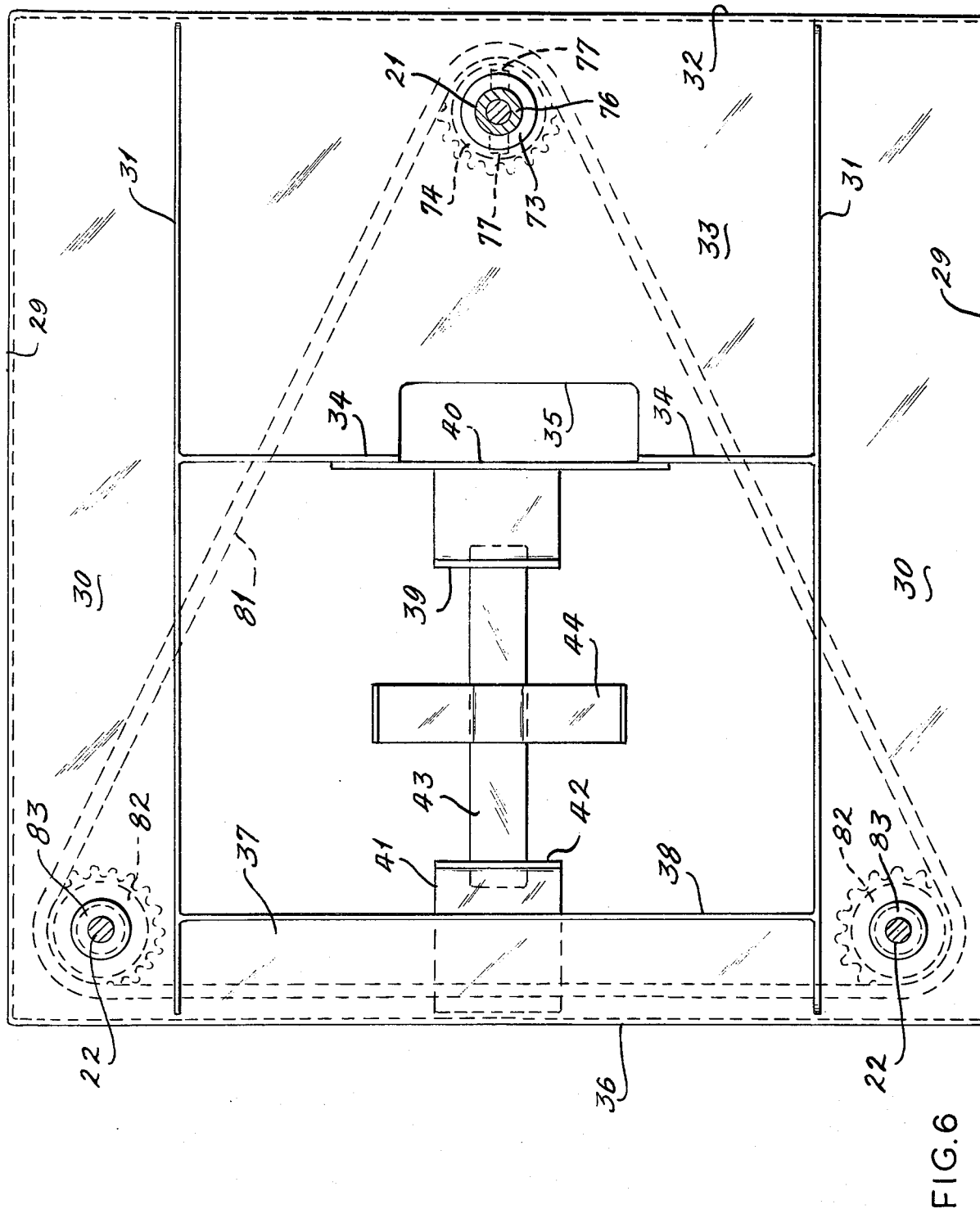
FIG. 6 is a view taken along line 6—6 in FIG. 2.

As can be seen in FIGS. 4, 5, and 6 the base supports a platform, and the platform is made up of longitudinal frame pieces having downturned outer flanges 29, horizontal surfaces 30 and upturned inner flanges 31. These frame pieces are held in spaced relation by a platform plate having a downturned flange 32, a horizontal surface 33 and an upturned flange 34 that is notched at cut-out 35. A second and smaller platform plate is located with its downturned flange 36 spaced from and parallel to the flange 32, a horizontal surface 37, and an upturned flange 38. The area between the upturned flanges 31, 34, and 38 (FIG. 6) is open so it will expose supporting members consisting of a U-shaped piece having an upturned bearing leg 39 and a supporting upturned leg 40 having a connection on the adjacent flange 34 at each side of the notch 35. An angle bracket member 41 is secured to the under side of surface 37 so its bearing leg 42 extend up and is aligned with the first bearing leg 39. The members 39 and 42 carry a strap 43 extending between them to support a cross-strap 44 which serves as a stop for torsion springs to be described.

In FIGS. 3 and 5 the drive means for the steering wheel comprises a pivot shaft 45 supported in the bearing legs 39 and 42. The pivot supports a first pair of arms 46 and 47, which arm 47 has an extension 48 directed beyond pivot 45 opposite to the arm 47. The outer ends of arms 46 and 47 support a shaft 49 on which one of the friction surface drums 24 is fixed. The shaft 49 extends out beyond arm 47 to receive a sprocket 50 for a drive chain 51. A similar pair of arms 52 and 53 are mounted on the pivot 45 in positions reversed to the arms 46 and 47. The arms 52 and 53 support a shaft 54 on which the other friction surface drum 24 is fixed. The shaft 54 extends beyond arm 52 to receive a sprocket 55 for a second drive chain 56. The arm 53 has an extension 57 beyond pivot 45. The extension arm 48 above noted carries a roller 58, and similarly arm extension 57 carries a roller 59.

The assembly of the arms 46 and 47 (FIGS. 3 and 4) is united by a cross brace member 60, and the other arms 52 and 53 are united by a similar cross brace member 61. The character of the means for supporting the friction surface drums 24 is that of a yoke having one long arm, with the long arms crossing to the opposite side of the main pivot shaft 45 (FIG. 4). The result is that when the drums 24 move up above pivot 45, the rollers 58 and 59 on the extension arms 48 and 57 respectively move down. An important feature of this construction is that the drums 24 can be made to follow the contour of the steering wheel 11, whether it is round or some "shaped" form. This result is achieved by incorporating torsion (mouse trap type) springs 62 and 63 on pivot 45 with the spring 62 having its lift arm 64 engaged under the cross brace member 60 for arms 46 and 47 and its fixed arm 65 bearing on the cross strap 44. Likewise, the spring 63 has its lift arm 66 engaged under the cross brace member 61 for arms 52 and 53 and its fixed arm 67 bearing on the cross strap 44.

The rotation of the drums 24 (FIG. 3) is effected by directing the chains 51 and 56 to a double sprocket 68 on the power output shaft of a gear drive unit 69. The axis of sprocket 68 is aligned with the axis of pivot 45 so that the chain 51 and 56 can drive the drums 24 in any angular position of the arms. The unit 69 is associated with the drive motor M, and the direction of motor rotation is selected by the switch unit 70 on the cable 15 (FIG. 1). The motor M may be supplied with power from a line 71 plugged into the service receptacle in the vehicle, or from an external source (not shown).

When the device is withdrawn from the vehicle or is not in use the springs 62 and 63 will force the drums 24 upwardly and the rollers 58 and 59 will move down in a scissor action. A limit on the inoperative position of the drums 24 is provided for by locating the ledges 25 and 28 (FIG. 5) in position to intercept the rollers 59 and 58 respectively. As can be seen in FIGS. 4 and 5, when the platform is lowered over the base the rollers 58 and 59 will engage the stop ledges 28 and 25 respectively and this will hold the drum members 24 in folded position over the platform. When the platform is raised by the action of the crank 80, the drum members will be locating by the springs 62 and 63 into steering wheel operating contact. Thus, the drums 24 are prevented by the rollers and stops from moving up and together to such an extent that it would be difficult to place the drums under the steering wheel 11. When in use, however, the drums 24 follow the steering wheel shape under the action of the spring arms 64 and 66, and the springs yield to the extent, as in FIG. 4, necessary to engage and follow the steering wheel rim. A round steering wheel will generally not cause the drums to move once the platform 23 has been adjusted to obtain the desired contact pressure by bodily raising or lowering the platform 23.

Figure 7:
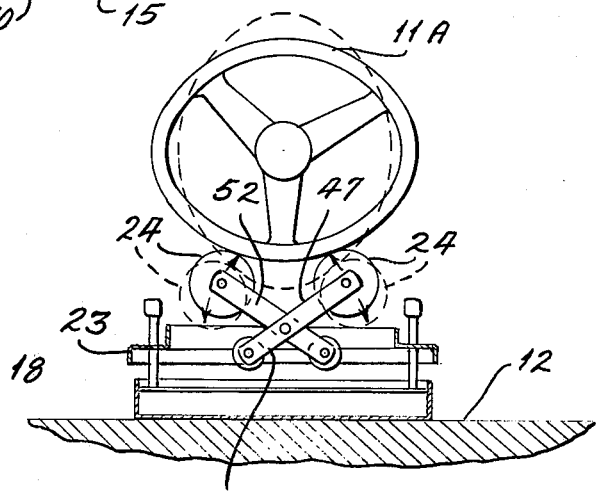
FIG. 7 is a fragmentary view to illustrate the way the steering wheel turning means accommodates itself to shaped steering wheels.

In FIG. 7, there has been shown a "shaped" steering wheel 11A (Exaggerated) which illustrates the motion of the drums 24 under the action of the springs 62 and 63 (FIG. 3), whereby the drums follow the shape of the steering wheel 11A and maintain contact for turning the wheel. The drums 24 are seen in full line and in phantom outline which positions correspond to the full line and phantom outline of the wheel 11A.

The platform 23 is adjustably mounted on the base 18 in the following manner. It has already been pointed out that a single screw post 21 and a pair of screw posts 22 are secured in the base 18 and project outwardly through apertures in the platform surfaces 33 and 30 (FIG. 6) respectively. The post 21 (FIG. 5) is threaded into a drive nut 72 and the nut is formed with an upwardly opening socket end portion 73. The nut 72 fits into the hub of a sprocket 74 and a set screw 75 secures the sprocket and nut for simultaneous rotation. The socket portion 73 receives the lower end of a torque sleeve 76 which encloses the upper end of the screw post 21, and set screws 77 secure these parts together. The upper end of the torque sleeve 76 is secured by set screws 78 to the hub 79 of a crank handle 80. The surface 33 of the platform 23 is captured between the sprocket hub 74 and the shoulder of the socket 73. Rotation of crank handle 80 will cause the nut to thread itself up or down on the screw post 21 while rotating the sprocket 74.

The crank driven screw post 21 is operatively associated with the pair of screw posts 22 by the endless chain 81 engaged therewith and powered by the sprocket 74. Each screw post 22 (FIG. 5) is extended through the hub of a sprocket 82 positioned under the surface 37 of the platform. The hub receives a nut that is provided with a flange 83 located on top of the surface 37. The nut within the hub is secured by a set screw 84 so that the rotation of the sprocket 82 will rotate the nut 83 and cause it to thread up or down on the screw post 22. Each post 22 has a removable cap 85 to prevent the platform 23 being elevated so the nuts 83 run off the top of the posts 22.

The foregoing description has set forth a steering wheel turning device that is simple to operate, and adjustable, and capable of being used on steering wheels of most any shape. The device is also unique in that it will selfcenter on the rim of the steering wheel, whereas a single drum or friction wheel has the tendency to ride off the rim in either direction of rotation.

What is claimed is:

1. A vehicle steering wheel turning device comprising a pair of steering wheel engaging members, means operably carrying said pair of steering wheel engaging members in position to move into steering wheel engagement at spaced points of contact, said carrying means comprising a base and a platform, a plurality of screw posts fixed in said base at spaced positions, cooperating rotary nuts engaged in said platform and riding on said posts, a drive member engaged on each rotary nut, common drive means engaged with said drive members to rotate said nuts in unison and effect movement of said platform relative to said base, and reversible motor means operably connected to both of said steering wheel engaging members to rotate said members simultaneously and in the same direction.

2. A vehicle steering wheel turning device comprising a base, a platform, a plurality of screw posts operatively engaged between said base and platform, endless means engaged with all of said posts, means engaged with one of said posts to rotate said one post and activate said endless means to rotate each of the other posts and move said platform relative to said base, a pivot carried on said platform, arms mounted on said pivot and extending in opposite directions, steering wheel engaging members operably mounted on said arms, and resilient means constantly pressing said arms in directions to hold said wheel engaging members in contact with the steering wheel.

3. A vehicle steering wheel turning device cooperative with the steering wheel spaced above the drivers seat and set on a steering column directed at an angle to the pitch of the drivers seat, said cooperative steering wheel turning device comprising the improvement of operative support means positionable on the drivers seat in a predetermined position and providing a surface at a pitch angle approaching the steering column pitch angle, steering wheel turning means operatively pivoted on said support means and adapted to engage the steering wheel for steering wheel turning purposes, spaced threaded posts fixed in said support means and spaced apart, nut and sprocket means engaged with said surface and threadedly engaged on said posts, operating means engaged on all of said sprocket means to rotate said nut and sprocket means simultaneously, first drive means engaged with one of said nut and sprocket means to rotate the same selectively in opposite directions to move said surface and adjust the steering wheel turning members contact on the steering wheel, said wheel turning means pivoting relative to said support means, resilient means engaged with said wheel turning means and urging the same to move into increasing contact on the steering wheel, other drive means having an axis aligned with said pivot for said steering wheel turning means, and means engaged between said other drive means and said steering wheel turning means to rotate said last means at any positions thereof relative to said pivot means.

4. A vehicle steering wheel turning device comprising a platform positionable in the vehicle adjacent the steering wheel, means engaged with said platform and operable to move said platform toward or away from the steering wheel, arm means operably mounted on said platform from a common pivot and extending in opposite directions, a steering wheel turning drum operably carried on each arm remote from said common pivot such that said drums are spaced from each other, resilient means engaged on each arm and normally operative to urge said arms in a direction to move said drums toward the steering wheel, a common drive operatively connected to said drums to rotate the steering wheel upon drum contact therewith, and means in the device to limit the movement of said arms by said resilient means such that with the device out of the vehicle the movement of said arms is stopped with said drums in spaced relation.

5. A vehicle steering wheel turning device comprising a pair of wheel engaging friction rollers, a pivot having a fixed position, a pair of arms mounted on said pivot and extending in crossed relation, said friction rollers being mounted one on each arm so as to be in spaced relation to each other and engageable with the steering wheel at spaced places, means to move said pivot toward and away from the steering wheel selectively to engage and disengage the steering wheel, means operative upon movement of said pivot away from the steering wheel to retain said friction rollers in a predetermined spaced relation ready to engage the steering wheel, and means to drive said friction rollers in reverse directions for turning the steering wheel in like manner.

6. A vehicle steering wheel turning device comprising a support positionable on the seat of a vehicle adjacent the steering wheel, a pivot fixed on said support, a pair of arms mounted on said pivot and extending therefrom in crossed relation, a wheel turning friction roller on each arm at an outer extremity to engage the steering wheel, motor means connected to each friction roller to drive the same in any position of said arms, resilient means normally urging said arms and rollers into wheel turning positions, means to bodily move said support relative to the steering wheel to accommodate variations in the distance from seat to steering wheel of different vehicles, said last means having a predetermined position in which said friction rollers are retracted from a steering wheel, and means in said device to stop the normal action of said resilient means on said crossed arms upon retraction of said friction rollers.

7. A vehicle steering wheel turning device comprising a frame, a pivot carried by said frame, a pair of steering wheel engaging rollers, arm means engaging each roller and supported on said pivot, said arm means being movable about and oppositely directed away from said pivot to locate said rollers in spaced relation to engage the steering wheel at spaced locations, a drive motor on said frame and having its axis aligned with said pivot, drive means extending from said drive motor axis to each of said rollers to drive said rollers simultaneously in any moved position of said arm means, and resilient means engaged with said arm means to urge said rollers in directions constantly engaging the steering wheel but yieldable to accommodate variations in steering wheel shapes.

* * * * *